United States Patent
Aten et al.

(10) Patent No.: US 6,870,020 B2
(45) Date of Patent: Mar. 22, 2005

(54) HIGH VINYL ETHER MODIFIED SINTERABLE POLYTETRAFLUOROETHYLENE

(75) Inventors: Ralph M. Aten, Chadds Ford, PA (US); Sharon Ann Libert, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/420,144

(22) Filed: Apr. 22, 2003

(65) Prior Publication Data

US 2003/0216531 A1 Nov. 20, 2003

Related U.S. Application Data

(60) Provisional application No. 60/376,645, filed on Apr. 30, 2002.

(51) Int. Cl.$^7$ ............................................... C08F 116/12
(52) U.S. Cl. ....................... 526/247; 526/250; 428/402; 264/117
(58) Field of Search ................................ 526/247, 250; 428/402; 264/117

(56) References Cited

U.S. PATENT DOCUMENTS

| | | | |
|---|---|---|---|
| 3,528,954 A | | 9/1970 | Carlson |
| 3,635,926 A | * | 1/1972 | Gresham et al. ............. 526/206 |
| 3,819,594 A | * | 6/1974 | Holmes et al. .............. 526/247 |
| 3,855,191 A | * | 12/1974 | Doughty et al. ............ 526/214 |
| 4,078,135 A | | 3/1978 | Sulzbach et al. |
| 4,379,900 A | | 4/1983 | Sulzbach |
| 4,380,618 A | | 4/1983 | Khan et al. |
| RE32,199 E | | 7/1986 | Carlson |
| 4,774,304 A | * | 9/1988 | Kuhls et al. ................ 526/247 |
| 5,153,285 A | | 10/1992 | Felix et al. |
| 5,530,078 A | | 6/1996 | Felix et al. |
| 5,576,402 A | | 11/1996 | Felix et al. |
| 5,589,558 A | | 12/1996 | Felix et al. |
| 5,709,944 A | | 1/1998 | Kokumai et al. |
| 5,733,416 A | * | 3/1998 | Kaiser .......................... 203/1 |
| 5,763,082 A | | 6/1998 | Kokumai et al. |

FOREIGN PATENT DOCUMENTS

| | | |
|---|---|---|
| EP | 0 931 798 A1 | 7/1999 |
| GB | 1116210 | 6/1968 |

OTHER PUBLICATIONS

Modern Fluoropolymers, Chapter 12 "Modified Polytetrafluoroethylene—the Second Generation" by Klaus Hintzer and Gemot Lohr, edited by John Scheirs, (c) 1997 John Wiley & Sons, Ltd., pp. 248–249.

* cited by examiner

*Primary Examiner*—David W. Wu
*Assistant Examiner*—Henry Hu

(57) ABSTRACT

Modified polytetrafluoroethylene powder of a sinterable copolymer of tetrafluoroethylene containing about 0.5 to about 10 weight % of fluorinated vinyl ether, the copolymer having a melt creep viscosity of greater than about $1 \times 10^6$ Pa·S. In preferred embodiments, the sinterable copolymer has a melt creep viscosity of greater than about $1 \times 10^7$ Pa·S and fluorinated vinyl ether content of from about 1 to about 7 weight %. The polymer has a combination of a high level of fluorinated vinyl ether and a melt creep viscosity which is high enough to enable the fabrication of articles by sintering.

20 Claims, No Drawings

HIGH VINYL ETHER MODIFIED SINTERABLE POLYTETRAFLUOROETHYLENE

FIELD OF THE INVENTION

This invention relates to improved polytetrafluoroethylene granular powders.

BACKGROUND OF THE INVENTION

Two general processes for polymerizing tetrafluoroethylene (TFE) to make non-melt processible polytetrafluoroethylene (PTFE) are known—(1) dispersion polymerization and (2) suspension polymerization. Each process produces polymer with distinctly different properties.

Polymer particles isolated from dispersion polymerization are commonly referred to as fine powder and have the characteristic property of fibrillating under shear stress. The powders can be fabricated into articles by a lubricated extrusion process known as paste extrusion with subsequent removal of the lubricant. The extrudate typically is processed further by heating the extrudate above the melting point of the polytetrafluoroethylene to sinter the extrudate into a tough, coherent article. Fine powder is not fabricable into articles by the common techniques described below used to process suspension polymerized PTFE.

Polymer particles isolated from suspension polymerization are commonly referred to as granular and are non-fibrillating and cannot be paste extruded. The isolated particles are typically irregular, fibrous and coarse and commonly subjected to various finishing operations such as cutting, or cutting and pelletizing, to obtain resin with better processing characteristics. Articles are commonly fabricated from granular powders by a preform/sintering technique adapted from powder metallurgy. The technique involves creating a preform and compacting at room temperature and then sintering the preform, optionally followed by machining. The sintering stage reduces and/or eliminates the void space by coalescence of the molten PTFE particles. These steps are quite time consuming.

Another important granular processing technique is called ram extrusion, which is a continuous powder sintering extrusion process for the production of continuous tubes and rods. In this process, a polytetrafluoroethylene powder is introduced, by means of an automatic metering device, in repetitive cycles into a tube which has been heated to sintering temperature, is compressed by means of a ram and is moved forward a corresponding distance within the sintering tube each time. Under these conditions, the powder sinters together to form a uniformly extruded shaped article.

Fine powder differs distinctly from granular powder in that it is not ram extrudable and is not fabricable into articles of any significant mass or thickness by the preform/sinter technique.

Efforts have been made to modify suspension polymerized polytetrafluoroethylene to make smaller, rounder raw polymer particles suitable for use in ram extrusion without the necessity of further pretreatment, such as cutting and pelletization. Such modification includes the addition of low levels of a comonomer of perfluoro(alkyl vinyl ether) (PAVE), where the perfluoro(alkyl) group is 1 to 3 carbon atoms as provided, for example, in British Patent Specification 1,116,210 issued May 24, 1967. Although levels of up to 1.5 mol % (4.3 wt %) of perfluoro(propyl vinyl ether) (PPVE) are postulated, the highest level of PPVE exemplified is 0.28 weight percent.

Heretofore, it has been believed by those skilled in the art that obtaining high molecular weight PTFE of a sinterable magnitude requires limiting comonomer incorporation. It has been previously demonstrated that copolymerization of TFE with high levels of fluorinated vinyl ether, even in the absence of chain transfer agent, results in a low molecular weight, melt processible polymer. Use of chain transfer agent in melt processible TFE/PAVE copolymerization imparts desirable secondary attributes, namely decreased unstable end groups and narrowed molecular weight distribution. As exemplified in Example 1 of U.S. Pat. No. 3,635,926 to Gresham et al., even when initiator is reduced to the level where chain transfer agent is required to lower molecular weight (thus enabling the acquisition of the desired secondary benefits of chain transfer agent), the polymer produced by copolymerization in dispersion aqueous polymerization is still melt processible and not sufficiently high in molecular weight to be sinterable.

What is desired is an improved granular resin that can be more easily processed and produce sintered articles with equal or improved mechanical properties.

BRIEF SUMMARY OF THE INVENTION

The invention provides a modified polytetrafluoroethylene powder of a sinterable copolymer of tetrafluoroethylene with from about 0.5 to about 10 weight % of fluorinated vinyl ether, said copolymer having a melt creep viscosity of greater than about $1\times10^6$ Pa·S. In preferred embodiments, the sinterable copolymer has a melt creep viscosity of greater than about $1\times10^7$ Pa·S and fluorinated vinyl ether content of from about 1 to about 7 weight %.

The invention further provides for a process for polymerizing tetrafluoroethylene and fluorinated vinyl ether in a suspension polymerization process by feeding pressurized tetrafluoroethylene into a polymerization vessel containing an agitated liquid medium, preferably water, with a dissolved free radical initiator and an initial amount of fluorinated vinyl ether. The polymerization is conducted in the absence of any significant amount of telogenic agent. After the initiation of the polymerization, fluorinated vinyl ether is continuously added in an amount sufficient to produce a sinterable copolymer of tetrafluoroethylene having from about 0.5 to about 10 weight % and a melt creep viscosity of greater than about $1\times10^6$ Pa·S.

The polymer of this invention is characterized by having surprisingly a combination of a high level of fluorinated vinyl ether and a melt creep viscosity which is high enough to enable fabrication of articles by sintering. The resulting new polymer composition combines the advantages of ultrahigh molecular weight perfluoropolymer in chemical resistance with the ease of processibility and superior physical properties of perfluorinated copolymer.

DETAILED DESCRIPTION OF THE INVENTION

The invention relates to highly modified sinterable polytetrafluoroethylene (PTFE). Modified PTFE refers to copolymers of TFE with small concentrations of a comonomer so that the melting point of the resultant polymer is not substantially reduced below that of PTFE homopolymer. Whereas it has been previously thought that the concentration of such comonomer should be preferably less than 0.5 weight % to preserve the desired characteristics of ultrahigh molecular weight perfluoropolymer, the modified sinterable PTFE of this invention comprises a copolymer of tetrafluoroethylene containing about 0.5 to about 10 weight % of fluorinated vinyl ether, preferably about 1 to about 7 weight % of the fluorinated vinyl ether, and most preferably about 1.5 to about 7 weight % of the fluorinated vinyl ether. The modified copolymer has a melt creep viscosity of greater than about $1 \times 10^6$ Pa·S and preferably greater than about $1 \times 10^7$ Pa·S. The fluorinated vinyl ether is preferably perfluoro(alkyl vinyl ether) (PAVE) and the alkyl group contains 1 to 5 carbon atoms. The PAVE can be, for example, perfluoro(methyl vinyl ether) (PMVE), perfluoro(ethyl vinyl ether) (PEVE) or perfluoro(propyl vinyl ether) (PPVE). Mixtures of fluorinated vinyl ethers can be used if desired.

The modified PTFE of this invention has the general non-fibrillatable character of PTFE made by previously known suspension polymerization processes. Because of its extremely high molecular weight, the resin is sinterable. By sinterable resin it is meant that the resin is non-melt processible and has a measurable melt creep viscosity as determined by the method described in U.S. Pat. No. 3,819,594. Such molecular weight ordinarily corresponds to standard specific gravity (SSG) of less than 2.25, and more commonly to SSG of less than 2.20, SSG being a parameter that decreases with increasing molecular weight. The general relationship between SSG and number average molecular weight is well known. See, for example, Sperati & Starkweather, Fortschr. Hochpolym.-Forsch. 2, 465 (1961).

The highly modified product of this invention, after appropriate finishing operations such as cutting, or cutting and pelletizing, is useful as granular resin, also known as molding resin. Because of the lower melting point of the highly modified resin of this invention, articles can be sintered at lower temperatures with shorter sintering cycles. The lower melting point provides a resin that can be processed by ram extrusion enabling manufacturing processes that are faster, conducted at lower temperatures and that produce articles with thinner walls.

As will be shown by example, polymer of this invention subjected to ram extrusion and sintering produces tube shaped products such as pipe liners and hoses that are at least 3x smoother than commercially available sintered PTFE and at least 1.5x smoother than commercially available sintered modified PTFE. Because the resin can be processed with fewer voids and smoother surfaces, such products have excellent electrical properties. Such resins also have value in semiconductor manufacturing areas where there is a stringent need for reducing contaminants. The present invention satisfies the need for a molded article having the heat and chemical resistance properties of PTFE and in addition having a smoother surface that resists adhesion of contaminants to the surface. The surface smoothness of the article substantially suppresses contamination in fluid handling equipment and therefore may be adapted to a broad range of applications in the area of the precision materials industry.

As will also be shown by example, the highly modified PTFE polymer of this invention exhibits better stress cracking resistance than commercially available PFA copolymer. A preferred highly modified PTFE of this invention has a stress crack resistance as measured by MIT flex life of greater than 50,000 cycles. The resin also has excellent optical properties with extremely low haze. Further, extruded products made from the resin of this invention exhibit superior mechanical properties such as better tensile strength and higher elongation than products made from commercially available PTFE, modified PTFE, and standard PFA copolymer resin.

The process of this invention is similar to TFE suspension polymerizations known in the art, involving the steps of precharging a liquid medium to a stirred autoclave, deoxygenating, pressuring with TFE to a predetermined level, adding comonomer and optional surfactant(s), and adding initiator at sufficient level to start and to maintain the polymerization reaction. Additional TFE and vinyl ether comonomer is added on a predetermined basis, for example to maintain a specified pressure or at a specified feed rate. Any workable pressure can be used in the process of this invention. High pressure offers an advantage over low pressure in increased reaction rate. Low pressure offers an advantage over higher pressure in increased comonomer incorporation. Generally, pressures in the range of about 0.3 to 7 MPa are used, and pressures in the range of 0.7 to 3.5 MPa are preferred. Pressures in the range of 0.7 to 2.5 MPa are more preferred, and pressures in the range of 0.7 to 1.9 MPa are especially preferred.

The vinyl ether comonomer is precharged and continuously added in an amount sufficient to produce a sinterable copolymer of tetrafluoroethylene with from about 0.5 to about 10 weight %, preferably from about 1 to about 7 weight %, and most preferably about 1.5 to about 7 weight % of the fluorinated vinyl ether, the copolymer having a melt creep viscosity of greater than about $1 \times 10^6$ Pa·S, preferably greater than about $1 \times 10^7$ Pa·S.

Polymerization temperatures known for use in the suspension polymerization of TFE may also be used for the practice of the present invention. Choice of temperature is generally determined by temperature dependence of initiator. Generally, the co-polymerization in accordance with the invention is carried out at a temperature of about 0° C. to about 100° C., more preferably about 10° C. to about 90° C., most preferably about 15° C. to about 75° C.

As in the suspension polymerization of unmodified high molecular weight PTFE and high molecular weight PTFE with low levels of comonomer, the reaction vessel in this polymerization process is agitated sufficiently to coagulate the polymer. In a preferred embodiment, the agitator is operated in a range of about 300 to about 800 rpm such as described in U.S. Pat. No. 5,405,923 to Aten. Because the polymer coagulates during polymerization, isolation can be performed directly from aqueous medium such as by draining the aqueous medium from the resulting polymer and drying. Washing and/or cutting the polymer can also be done if desired.

The suspension polymerization process is conducted in the absence of any significant amount of telogenic agent. For the purposes of this patent application, the term telogenic agent broadly refers to any agent that will prematurely stop chain growth and includes what is commonly known as chain transfer agents. The term chain transfer implies the stopping of growth of one polymer chain and the initiation of growth of another in that the number of growing polymer radicals remains the same and the polymerization proceeds at the same rate without the introduction of more initiator. A telogenic agent produces lower molecular weight polymer in its presence than in its absence and the number of polymer chain radicals growing either remains the same or decreases. In practice most agents, if present in sufficient quantities, tend to decrease the number of radicals and ultimately the polymerization rate.

The suspension polymerization process of this invention is preferably conducted in aqueous medium. Water is convenient, liquid over a broad temperature range, essentially non-telogenic when impurities are reduced to a low level, inexpensive and safe. Preferably, the aqueous medium is essentially free of fluorine-containing organic solvent.

Initiator levels can be high relative to the amounts typically used for known modified PTFE polymerization. This achieves a surprisingly high space-time yield without the decrease in molecular weight expected in the presence of high levels of initiator. Initiators that can be used in the practice of this invention include any free radical initiator for TFE polymerization that is effective over the temperature range to be employed. Initiators commonly employed in aqueous polymerization are thermally activated water-soluble free radical initiators such as ammonium persulfate (APS), potassium persulfate (KPS), or combinations thereof, or chemically activated redox systems such as potassium permanganate/oxalic acid/potassium bisulfite, potassium persulfate/potassium bisulfite/iron sulfate, or potassium bromate/potassium bisulfite/oxalic acid and the like.

Small amounts of non-telogenic fluorinated surfactant can be used in the process of this invention as polymerization aids. Amounts of such non-telogenic fluorinated surfactant are preferably less than 1000 ppm, more preferably less than 500 ppm and most preferably less than 100 ppm, by weight based on the amount of liquid medium employed in the polymerization. Such surfactants can include, for example, ammonium perfluorooctanoate, ammonium omega-hydroperfluorononanoate, and the perfluoroalkyl ethane sulfonic acids and salts thereof disclosed in U.S. Pat. No. 4,380,618. Of particular utility in the production of the resin of this invention are relatively small amounts of perfluoro(polyether) carboxylic acids or dicarboxylic acids, or perfluoro(polyether) sulfonic acids or disulfonic acids, or the salts thereof. Use of such surfactants tends to enhance incorporation of vinyl ether comonomer and overall polymerization rate.

TEST METHODS

Fluoropolymer composition is determined by using Fourier transform infrared (FTIR) spectroscopy on 0.095–0.105 mm thick films pressed at 380° C. The FTIR absorption band to 4.25 $\mu$m is used as an internal thickness standard. PPVE content is determined from the FTIR band at 10.1 $\mu$m and is calculated in wt % as 0.97× the ratio of the 10.1 $\mu$m absorbance to the 4.25 $\mu$m absorbance. PEVE content is determined from the FTIR band at 9.18 $\mu$m and is calculated in weight % as 1.3× the ratio of the 9.18 $\mu$m absorbance to the 4.25 $\mu$m absorbance.

Melt viscosity measured by extrusion through a capillary orifice (capillary or extrusion viscosity) is determined at 372° C. by ASTM method D1238-52T modified as described in U.S. Pat. No. 4,380,618. This capillary viscosity is that which is normally employed for melt processible resins. A sinterable, non-melt processible resin in this test does not extrude through the capillary orifice.

Melt creep viscosity measured by the rate of elongation of a strip of resin under tensile stress (elongational viscosity) is determined at 380° C. as described in U.S. Pat. No. 3,819,594 unless otherwise specified. This elongational viscosity is that which is normally employed for sinterable, non-melt processible resins. A strip of melt processible resin, defined as a resin with an observable extrusion through the above described capillary test, in the elongational test drips and breaks before rate of elongation can be measured under load. Standard Specific Gravity (SSG) of finished resin is characterized according to ASTM Specification D-4894 which describes procedures for molding, sintering, determination of SSG unless otherwise specified.

MIT Flex Life is a modification of ASTM D-2176, the standard test method for folding endurance of paper by the MIT tester. The test is adapted to determine the flex life of films of polymer resin. The test shows the ability of a film to withstand repeated bending, folding and creasing.

Measurements are made on skived films having a rectangular shape 0.5 inches wide by 5 inches long and 0.050 inch thick (1.27 mm) unless otherwise noted. Skived film is prepared according to the method described in ASTM D4894.

The standard MIT Flex Tester, folding endurance test apparatus is available from Tinius Olsen, Testing Machine Co. of Willow Grove Pa. The test apparatus is provided with a No. 8 spring and a 1.0 kg load. Tests are conducted in two directions (machine and transverse) of the film sample. The results of five tests are averaged. The test results indicate the number of double folds required to break a sample.

Tensile strength and elongation of extruded tubing are measured per ASTM D-638 with a special test specimen shape. The test specimens are strips cut with a utility knife from the extruded tube in the axial direction (long dimension). Each specimen dimension is 7.62 cm (3 inches) long by 1.0 cm (0.4 inches) wide. The thickness is determined by the wall thickness of the tube 3.30 mm (0.130 inches) unless otherwise noted. The initial jaw separation is be 22.2±0.13 mm (0.875±0.005 inches) and the speed of testing is 50 mm (2.0 inch)/min.

Surface smoothness is measured on a sample of tubing 10 cm long using a profilometer (Mitutoyo Surftest Model SJ-301) with a diamond stylus. The stylus is calibrated to a reference surface and then set on the outside surface of the tube, with the long dimension of the stylus centered over the tube and parallel to the long dimension of the tube. The stylus is translated along the tube surface in the axial direction (long dimension) for a distance of 0.03 inches (0.762 mm) and the Rq (root mean square) is recorded. This measurement is made at five evenly spaced places along the length of the tube. Reported values are the average of the five measurements taken. Smaller values of Rq indicate a smoother surface.

EXAMPLES

The polymerizations described in the comparative examples and examples below are all conducted in a 37.9-liter stainless steel autoclave encased in a jacket through which heat transfer fluid is circulated for heating or cooling purposes. This autoclave is equipped with a two-bladed, 45-degree angled, flat downdraft agitator mounted on a vertical shaft. Pressures reported in the following are on an absolute basis. Wet product of polymerization, unless otherwise noted, is finished by cutting at about 3–7° C. in a high speed comminuting machine (Model VFSTS-06-SSB, Taylor, Stiles & Co.) and then drying in a circulating air oven for 24–48 hr at about 150° C.

COMPARATIVE EXAMPLES A–D

Comparative Examples A through D produce sinterable, vinyl ether modified granular PTFE similar to that taught by the prior art of granular PTFE polymerization.

Comparative Example A

The autoclave is charged with 21.3 L of demineralized water, 1 g of citric acid, 1 g of oxalic acid and 0.1 g of potassium meta-bisulfite. After oxygen removal, 15 g of perfluoro(propyl vinyl ether), PPVE, is introduced through the stopcock. The autoclave is pressured to 1.83 MPa at 15° C. and agitated at 700 rpm. An initiator solution of 0.12 mg/L of $KMnO_4$ is injected at 5 ml/minute, for an injection rate of 0.6 mg $KMnO_4$ per minute, continuously through the remainder of the batch. After 10 minutes of $KMnO_4$ initiator solution injection, a slight drop in pressure indicated onset of polymerization. At this point TFE is fed continuously into the autoclave to maintain a pressure of 1.83 MPa. After 141 minutes, 7258 g of TFE has been converted into polymer. At this point the TFE feed valve is closed and the autoclave is reacted down from 1.83 MPa to 0.7 MPa. The raw polymer, before cutting, has a finely shredded fibrous appearance typical of PTFE granular. The polymer has a comonomer content of 0.08 weight percent PPVE, an SSG of 2.159 and a melt creep viscosity of $1.4 \times 10^9$ Pa·S. The second melting point of this resin as measured by DSC is 323.22° C., which is typical of modified PTFE.

Comparative Example B

A batch is run in a manner similar to Comparative Example A, except that 48 g of perfluoro(ethyl vinyl ether), PEVE, is charged to the autoclave with the injection pump after oxygen removal, and $KMnO_4$ initiator solution is injected at a rate of 0.25 mg $KMnO_4$ per minute. After 180 minutes 1497 g of TFE has been converted into polymer. At this point the TFE feed valve is closed and the excess monomer is vented from the autoclave. The resulting polymer has a comonomer content of 0.10 weight percent PEVE, an SSG of 2.145 and a melt creep viscosity of $1.5 \times 10^9$ Pa·S as measured by elongational deformation.

Comparative Example C

The autoclave is charged with 21.3 L of demineralized water and 1 g of citric acid. Oxygen is then removed from the autoclave by alternately pressuring with 1540 g of TFE and evacuating. Using a high-pressure pump (microfeeder), 23 g of perfluoro(propyl vinyl ether), PPVE, is charged. The autoclave is pressured with TFE to 1.83 MPa at 65° C. and agitated at 700 rpm. A solution of ammonium persulfate, APS, with a concentration of 5 g/L is injected at 50 ml/min into the autoclave for 6 minutes, for a total of 1.5 g APS injected. At the end of the APS injection, a slight pressure drop is observed indicating start of polymerization (kickoff). The TFE feed valve is opened, and additional TFE monomer is continuously fed into the autoclave to maintain the pressure at 1.83 MPa during the subsequent course of the reaction. During the course of the reaction, the temperature is maintained at 65° C. After 85 min of reaction measured from kickoff, 5443 g of TFE has been converted into polymer. At this point the TFE feed valve is closed and the autoclave is reacted down from 1.83 MPa to 0.2 MPa. The resulting polymer has a comonomer content of 0.10 weight percent PPVE, an SSG of 2.170 and a melt creep viscosity of $1.1 \times 10^9$ Pa·S.

Comparative Example D

A batch is run in a manner similar to Comparative Example C, except that the polymerization temperature is 71° C., after oxygen removal 15 grams of PPVE is introduced through a stopcock funnel, and a total of 2.3 g of APS is used as the initiator. After 55 min of reaction measured from kickoff, 7258 g of TFE has been converted into polymer. At this point the TFE feed valve is closed and excess monomer is vented from the autoclave. The resulting polymer has a comonomer content of 0.08 weight percent PPVE, an SSG of 2.194 and an melt creep viscosity of $8 \times 10^8$ Pa·S.

Example 1

This example illustrates the suspension polymerization of highly modified sinterable PTFE at elevated temperature similar to the preparation exemplified in Brubaker U.S. Pat. No. 2,393,967. The autoclave is charged with 21.3 L of demineralized water and 1 g of citric acid. After oxygen removal, 25 g of perfluoro(propyl vinyl ether), PPVE, is charged through the stopcock. The autoclave is pressured to 1.83 MPa with TFE at 65° C. A total of 3 g of APS is injected as initiator. After kickoff, the TFE feed valve is opened, and additional TFE monomer is continuously fed into the autoclave to maintain the pressure at 1.83 MPa during the subsequent course of the reaction. At the same time, additional PPVE is injected into the autoclave at a rate of 4.5 g/min for 60 minutes, for a total of 180 g of PPVE added after kickoff. During the course of the reaction, the temperature is maintained at 65° C. After 100 min of reaction measured from kickoff, 5443 g of TFE has been converted into polymer. At this point the TFE feed valve is closed and the excess monomer is vented from the autoclave. The resulting polymer has a comonomer content of 1.40 weight percent PPVE, an SSG of 2.178 and a melt creep viscosity of $1.2 \times 10^9$ Pa·S. The second melting point of this resin as measured by DSC is 322.36° C., very similar to the lightly modified resin of Comparative Example A, even though the vinyl ether content is higher by over an order of magnitude.

Example 2

This example illustrates the suspension polymerization of highly modified sinterable PTFE using low initiation temperature as taught by Aten in U.S. Pat. No. 5,405,923. The autoclave is charged with 21.3 L of demineralized water, 1 g of citric acid, 1 g of oxalic acid and 0.1 g of potassium meta-bisulfite. After oxygen removal, 9 g of PPVE is introduced through the stopcock. The autoclave is pressured to 1.83 MPa at 15° C. and agitated at 700 rpm. An initiator solution of 1 g/L of $KMnO_4$ is injected at 10 ml/minute, for an injection rate of 10 mg $KMnO_4$ per minute, continuously through the remainder of the batch. After kickoff, TFE is fed continuously into the autoclave to maintain a pressure of 1.83 MPa. At the same time, additional PPVE is injected into the autoclave at a rate of 1.5 g/min for 60 minutes, for a total of 90 g of PPVE added after kickoff. After 100 min of reaction measured from kickoff, 1678 g of TFE has been converted into polymer. At this point the TFE feed valve is closed and the autoclave is vented. The resulting polymer has a comonomer content of 1.42 weight percent PPVE, an SSG of 2.147 and a melt creep viscosity of $1.3 \times 10^9$ Pa·S.

Example 3

This example illustrates use of non-telogenic surfactant as a polymerization aid in the suspension polymerization of highly modified sinterable PTFE. A batch is run in a manner similar to Example 1, except that 1 gram of KRYTOX® 157FSL, a poly(hexafluoropropylene oxide) carboxylic acid (commercially available from the DuPont Company), is precharged, 300 g of PPVE is precharged, 16.2 g of APS is used as the initiator, and an additional PPVE is injected into the autoclave at a rate of 7.5 g/min for 40 minutes, for a total of 3000 g of PPVE added after kickoff. After 83 min of reaction measured from kickoff, 5443 g of TFE has been converted into polymer. At this point the TFE feed valve is closed and the excess monomer is vented from the autoclave. The resulting polymer has a comonomer content of 1.64 weight percent PPVE, an SSG of 2.189 and a melt creep viscosity of $4 \times 10^8$ Pa·S.

Example 4

This example further illustrates use of non-telogenic surfactant as a polymerization aid in the suspension polymerization of highly modified sinterable PTFE. A batch is run in a manner similar to Example 1, except that 1 gram of FLUOROLINK® C, a perfluoropolyether dicarboxylic acid (commercially available from Ausimont), is precharged, 300 g of PPVE is precharged, 16.2 g of APS is used as the initiator, and an additional PPVE is injected into the autoclave at a rate of 7.5 g/min for 40 minutes, for a total of 3000 g of PPVE added after kickoff. After 86 min of reaction measured from kickoff, 5443 g of TFE has been converted into polymer. At this point the TFE feed valve is closed and the excess monomer is vented from the autoclave. The resulting polymer has a comonomer content of 2.53 weight percent PPVE, an SSG of 2.178 and a melt creep viscosity of $8 \times 10^8$ Pa·S.

Examples 5–24

Examples employing PPVE comonomer are run in a manner similar to Example 1 to further demonstrate and exemplify the invention. Variations of the recipe of Example 1 and the results of the polymerizations thereof are shown in Table 1.

after kickoff. After 100 min of reaction measured from kickoff, 4536 g of TFE has been converted into polymer. At this point the TFE feed valve is closed and the excess monomer is vented from the autoclave. The resulting polymer has a comonomer content of 5.10 weight percent PEVE. The second melting point of this resin as measured by DSC is 315.4° C., significantly lower than the ca. 323° C. observed of PTFE modified with PPVE. PEVE, being a more reactive comonomer, gave higher level of incorporation which disrupted the crystallinity sufficiently to lower the melting point. Consequently, the melt creep viscosity of this resin is measured at 372° C. The melt creep viscosity is $3 \times 10^6$ Pa·S. Taking advantage of the lowered melting point in a similar manner, the SSG chip is sintered by directly inserting into a preheated oven at 335° C. for 20 minutes followed by removal to cool on the laboratory bench top. The SSG chip upon exit of the oven is completely transparent, with none of the haze normally observed in a partially sintered homopolymer or modified PTFE billet. The specific gravity measured on the sintered chip is 2.153.

TABLE 1

| Example | g APS prech. | g PPVE prech. | g/min PPVE injected | PPVE Injection time, min | g PPVE injected | Batch time, min | g TFE Consumed | wt % PPVE | SSG | Melt creep Viscosity Pa · S |
|---|---|---|---|---|---|---|---|---|---|---|
| 5 | 6.9 | 150 | 1.5 | 83 | 125 | 83 | 5443 | 0.83 | 2.178 | $1.7 \times 10^9$ |
| 6 | 6 | 75 | 3 | 45 | 135 | 78 | 5443 | 0.77 | 2.179 | $1.4 \times 10^9$ |
| 7 | 6 | 38 | 4.5 | 60 | 270 | 89 | 5443 | 0.98 | 2.178 | $1.3 \times 10^9$ |
| 8 | 6 | 75 | 3 | 75 | 225 | 100 | 5534 | 0.96 | 2.172 | $2.3 \times 10^9$ |
| 9 | 10.4 | 38 | 4.5 | 60 | 270 | 65 | 3901 | 1.22 | 2.203 | $2 \times 10^8$ |
| 10 | 6 | 38 | 4.5 | 60 | 270 | 74 | 4627 | 1.24 | 2.209 | $1 \times 10^8$ |
| 11 | 3 | 38 | 4.5 | 60 | 270 | 92 | 4944 | 1.27 | 2.195 | $3 \times 10^8$ |
| 12 | 6 | 38 | 6 | 45 | 270 | 81 | 4763 | 1.27 | 2.200 | $1 \times 10^8$ |
| 13 | 6 | 18 | 7.5 | 40 | 300 | 50 | 1769 | 0.94 | 2.192 | $6 \times 10^7$ |
| 14 | 6 | 18 | 7.5 | 40 | 300 | 69 | 4808 | 1.39 | 2.200 | $2 \times 10^8$ |
| 15 | 6 | 38 | 7.5 | 40 | 300 | 67 | 3175 | 1.60 | 2.203 | $1 \times 10^8$ |
| 16 | 12 | 75 | 7.5 | 40 | 300 | 77 | 5443 | 1.42 | 2.205 | $2 \times 10^8$ |
| 17 | 12 | 75 | 7.5 | 40 | 300 | 72 | 5851 | 1.52 | 2.212 | $2 \times 10^8$ |
| 18 | 12 | 75 | 7.5 | 40 | 300 | 83 | 6895 | 1.51 | 2.205 | $2 \times 10^8$ |
| 19 | 12 | 37 | 7.5 | 40 | 300 | 83 | 5443 | 1.12 | 2.175 | $1.1 \times 10^8$ |
| 20[a] | 6 | 37 | 7.5 | 40 | 300 | 85 | 5443 | 1.13 | 2.191 | $2 \times 10^8$ |
| 21[a] | 6 | 37 | 7.5 | 40 | 300 | 86 | 5443 | 1.28 | 2.187 | $4 \times 10^8$ |
| 22[b] | 3 | 37 | 7.5 | 40 | 300 | 83 | 5443 | 1.35 | 2.197 | $1.4 \times 10^8$ |
| 23 | 27 | 300 | 4.5 | 80 | 360 | 79 | 5443 | 1.74 | 2.188 | $5 \times 10^7$ |
| 24 | 27 | 600 | 7.5 | 45 | 338 | 75 | 5443 | 2.30 | 2.200 | $7 \times 10^7$ |

[a]Polymerized at 70° C.
[b]Polymerized at 75° C.

Example 25

A batch is run in a manner similar to Example 1, except that 300 g of perfluoro(ethyl vinyl ether), PEVE is precharged, 27 g of APS is used as the initiator, and additional PEVE is injected into the autoclave at a rate of 4.5 g/min for 80 minutes, for a total of 360 g of PEVE added Examples 26–30

Examples employing PEVE comonomer are run in a manner similar to Example 25 to further demonstrate and exemplify the invention. Variations of the recipe of Example 1 and the results of the polymerizations thereof are shown in Table 2.

TABLE 2

| Example | g APS pre. | g PEVE pre. | g/min PEVE Injected | PEVE Injection Time, min | G PEVE Injected | Batch time, min | g TFE Consumed | wt % PEVE | SG[c] | Melt creep creep viscosity[d] Pa · S |
|---|---|---|---|---|---|---|---|---|---|---|
| 26 | 12 | 37 | 7.5 | 40 | 300 | 83 | 5443 | 2.91 | 2.183 | $4 \times 10^6$ |
| 27[a] | 8 | 37 | 7.5 | 40 | 300 | 93 | 5443 | 3.28 | 2.174 | $4 \times 10^6$ |
| 28[b] | 3 | 37 | 7.5 | 40 | 300 | 80 | 907 | 3.00 | 2.139 | $9 \times 10^6$ |

TABLE 2-continued

| Example | g APS pre. | g PEVE pre. | g/min PEVE Injected | PEVE Injection Time, min | G PEVE Injected | Batch time, min | g TFE Consumed | wt % PEVE | SG[c] | Melt creep creep viscosity[d] Pa · S |
|---|---|---|---|---|---|---|---|---|---|---|
| 29[b] | 3 | 37 | 7.5 | 40 | 300 | 100 | 4536 | 3.57 | 2.180 | 1.0 × 10$^7$ |
| 30 | 27 | 1800 | 15 | 80 | 800 | 100 | 1588 | 5.31 | 2.155 | 5 × 10$^6$ |

[a]Polymerized at 70° C.
[b]Polymerized at 75° C.
[c]Measured on SSG chip after sintering 20 minutes in a preheated 325° C. oven.
[d]Measured at 372° C.

Examples 31–34

Batches are run in a manner similar to Example 1, except that 300 g of perfluoro(methyl vinyl ether), PMVE, is precharged, 27 g of APS is used as the initiator, and additional PMVE is injected into the autoclave at a rate of 4.5 g/min for 40 minutes, for a total of 180 g of PMVE added after kickoff. Results of the polymerizations are shown in Table 3.

TABLE 3

| Example | Batch time minutes | g TFE Consumed | wt % PMVE | SG[a] | Melt creep Viscosity Pa · S |
|---|---|---|---|---|---|
| 31 | 100 | 1179 | 1.08 | 2.130 | 3.03 × 10$^7$ |
| 32 | 51 | 1814 | 2.73 | 2.135 | 1.82 × 10$^6$ |
| 33 | 100 | 3175 | 4.00 | 2.103 | 2.66 × 10$^6$ |
| 34 | 35 | 907 | 4.12 | 2.121 | 6.12 × 10$^6$ |

[a]Measured on SSG chip after sintering 20 minutes in a preheated 335° C. oven.

Example 35—MIT Flex Life

The standard MIT folding endurance tester as modified in the description above is used to determine the flex life of polymers of this invention in comparison to commercially available polymer compositions.

Measurements are made on skived films of polymers prepared in Examples 1, 5–8. The film samples have a rectangular shape of 0.5 inch (1.27 cm) wide by 5 inches (12.7 cm) long and 0.050 inch thick (01.27 mm).

Measurements are made on Comparative Film E which is commercially available DuPont PFA 6000 film, a melt processable copolymer of TFE and PPVE with PPVE content of 4 weight percent and melt viscosity, as measured by the capillary technique in a melt indexer, of 3×10$^4$ Pa·S. The film sample has a rectangular shape 0.5 inch (1.27 cm) wide by 5 inches (12.7 cm) long and 0.060 inch thick (01.52 mm).

MIT Flex Life results are reported in Table 4.

TABLE 4

| Polymer | MIT Flex Life (cycles) |
|---|---|
| Example 1 | 67,953 |
| Example 5 | 82,875 |
| Example 6 | 76,117 |
| Example 7 | 70,788 |
| Example 8 | 132,618 |
| Comparative E | 417 |

High MIT flex life of greater than 50,000 cycles for film of highly modified granular resin indicates much better stress cracking resistance than film made from commercial copolymer (Comparative Film E).

Example 36—Ram Extrusion

The physical properties of ram extruded polymer of this invention are compared to commercially available polymer.

Polymers used for this example are:

Example 26

Comparative Polymer F Commercially available NXT 75 (available from DuPont Fluoroproducts, Wilmington Del.), a PPVE modified sinterable granular with PTFE content of 0.1 weight percent and melt creep viscosity of 1×10$^9$ Pa·S.

Comparative Polymer G Commercially available 9B (available DuPont Fluoroproducts, Wilmington Del.), an unmodified homopolymer granular with melt creep viscosity of 5×10$^{10}$ Pa·S.

Comparative Polymer H Commercially available PFA 350 (available from DuPont Fluoroproducts, Wilmington, Del.), a melt processible copolymer of TFE and PPVE with PPVE content of 4 weight percent and melt viscosity, as measured by the capillary technique in a melt indexer, of 3×10$^4$ Pa·S.

Samples of tubing material for the polymers of this example, except Comparative Polymer H, are obtained by the process of ram extruding in a commercial machine model number DU.VRE.10J available from Phillips Scientific Company located in Rock Hill, S.C.

The ram extrusion run conditions that are used to produce the tubing shaped material are listed in Table 5.

In this process a metered charge of resin is fed to the cold end of an extruder die that is heated over most of its length. A ram of cylindrical shape fitted with a mandrel through the center is driven down with hydraulic pressure at a controlled rate of speed and compresses the resin in the feed throat of the extruder into a charge. The hydraulic pressure driving the ram overcomes the backpressure generated by friction at the extruder walls and the brake force and moves the compressed resin charge into the barrel of the ram extruder. The ram retracts to allow the next charge to be fed. Each subsequent compressed resin charge advances the material step by step into the six heated zones of the extruder where the material is sintered at temperatures ranging from the melting point of the highly modified material up to the standard sintering temperatures for PTFE as detailed in Table 5. The individual resin charges are welded together during the sintering phase of the ram extrusion process. A continuous length of sintered extrudate emerges from the end of the ram die.

TABLE 5

Ram Extrusion Run Conditions

| Polymer | Comp. F,G | Example 26 |
|---|---|---|
| Barrel Temps, ° F. | | |
| Zone 1 | 680 | 660 |
| Zone 2 | 720 | 680 |
| Zone 3 | 720 | 690 |
| Zone 4 | 720 | 660 |
| Zone 5 | 720 | 660 |
| Zone 6 | 680 | 660 |
| Barrel Pressure, psi | 577 | 532 |
| Extrusion rate, ft/hr | 11 | 11 |

Melt extruded tubing of Comparative Polymer H is produced on a 1½ inch Davis Standard extruder (commercially available from Davis-Standard Corporation located in Pawcatuck, Conn.). The extruder setup includes a ¾ in. OD/0.060 in wall tubing die, a vacuum box leveling die, the tube take-up system and automatic cutter.

The extruder and die temperature profiles are recorded in Table 6. The polymer melt temperatures average 640° F. (338° C.) and all grades achieved stable melt cones that averaged 1¼ inch (3.175 cm) in length. The temperature profiles are maintained as follows. The wall thickness of the extruded tube is 0.060 inches (1.52 mm).

TABLE 6

Melt Extruder Conditions

| Extruder zone | 1 | 2 | 3 | 4 | |
|---|---|---|---|---|---|
| Temp, ° F. | 625 | 650 | 665 | 665 | |
| Die zone | 1 | 2 | 3 | 4 | 5 |
| Temp, ° F. | 665 | 665 | 675 | 680 | 690 |

As described under Test Methods, test specimens for all polymers are cut according to the dimensions specified for Tensile Strength and Elongation measurement except that the film sample from Comparative Polymer H has a thickness dimension of 0.060 inch (1.52 mm), in accordance with the extruded tubing wall thickness. In addition, surface smoothness is determined according to the method described above. Tensile strength, elongation and smoothness for all specimens are recorded in Table 7 below.

The highly modified vinyl ether resins processed in the ram extrusion process produces tubing with superior properties when compared to standard PTFE, standard modified PTFE and PFA.

The highly modified vinyl ether resin produces tube shaped products that are at least 3× smoother than commercially available sintered PTFE and at least 1.5× smoother than commercially available sintered modified PTFE.

Further, the resin exhibits superior mechanical properties such as better tensile strength and higher elongation than commercially available PTFE, modified PTFE, and standard PFA copolymer resin.

TABLE 7

Physical Properties of Highly Modified PTFE versus Commercially Available Polymer

| Resin | Comparative G 9B | Comparative F NXT | Comparative H PFA | Example 26 |
|---|---|---|---|---|
| Physical Property | | | | |
| Tensile Strength, psi | 2500 | 1870 | 2360 | 2825 |
| Elongation, % | 390 | 280 | 260 | 700 |
| Surface smoothness, Rq | 14.9 | 6.9 | 4.2 | 4.4 |

What is claimed is:

1. Modified polytetrafluoroethylene powder comprising a sinterable copolymer of tetrafluoroethylene containing about 0.5 to about 10 weight % of fluorinated vinyl ether, said copolymer having a melt creep viscosity of greater than about $1 \times 10^6$ Pa·S.

2. The modified polytetrafluoroethylene powder of claim 1 wherein said sinterable copolymer contains from about 1 to about 7 weight % of said fluorinated vinyl ether.

3. The modified polytetrafluoroethylene powder of claim 1 wherein said sinterable copolymer contains from about 1.5 to about 7 weight % of said fluorinated vinyl ether.

4. The modified polytetrafluoroethylene powder of claim 1 wherein said sinterable copolymer has a melt creep viscosity of greater than about $1 \times 10^7$ Pa·S.

5. The modified polytetrafluoroethylene powder of claim 1 wherein said fluorinated vinyl ether is perfluoro(alkyl vinyl ether) and the alkyl group contains 1 to 5 carbon atoms.

6. The modified polytetrafluoroethylene powder of claim 5 wherein said perfluoro(alkyl vinyl ether) is perfluoro (propyl vinyl ether).

7. The modified polytetrafluoroethylene powder of claim 5 wherein said perfluoro(alkyl vinyl ether) is perfluoro(ethyl vinyl ether).

8. The modified polytetrafluoroethylene powder of claim 5 wherein said perfluoro(alkyl vinyl ether) is perfluoro (methyl vinyl ether).

9. The modified polytetrafluoroethylene powder of claim 1 having a stress crack resistance as measured by MIT flex life of greater than 50,000 cycles.

10. A process for polymerizing tetrafluoroethylene and fluorinated vinyl ether in a suspension polymerization process by feeding pressurized tetrafluoroethylene into a polymerization vessel containing an agitated liquid medium containing a dissolved free radical initiator, said polymerization vessel containing an initial amount of fluorinated vinyl ether, conducting the polymerization in the absence of any significant amount of telogenic agent, and after the initiation of the polymerization, adding fluorinated vinyl ether on a predetermined basis in an amount to produce a sinterable copolymer of tetrafluoroethylene with from about 0.5 to about 10 weight % of said fluorinated vinyl ether, said copolymer having a melt creep viscosity of greater than about $1 \times 10^6$ Pa·S.

11. The process of claim 10 wherein said liquid medium is water.

12. The process of claim 10 wherein a sufficient amount of fluorinated vinyl ether is added to produce sinterable copolymer containing from about 1 to about 7 weight % of said fluorinated vinyl ether.

13. The process of claim 10 wherein said sinterable copolymer has a melt creep viscosity of greater than about $1 \times 10^7$ Pa·S.

14. The process of claim 10 wherein said fluorinated vinyl ether is perfluoro(alkyl vinyl ether) and the alkyl group contains 1 to 5 carbon atoms.

15. The process of claim 14 wherein said perfluoro(alkyl vinyl ether) is perfluoro(propyl vinyl ether).

16. The process of claim 14 wherein said perfluoro(alkyl vinyl ether) is perfluoro(ethyl vinyl ether).

17. The process of claim 14 wherein said perfluoro(alkyl vinyl ether) is perfluoro(methyl vinyl ether).

18. The process of claim 10 wherein said sinterable copolymer has a stress crack resistance as measured by MIT flex life of greater than 50,000 cycles.

19. The process of claim 10 wherein the polymerization is conducted in the presence of non-telogenic fluorinated surfactant.

20. The process of claim 19 wherein the fluorinated surfactant is perfluoro(polyether) carboxylic acid or perfluoro(polyether) dicarboxylic acid.

* * * * *